April 8, 1958 R. FAIGLE 2,829,821

SELECTIVE DELAY NORMALIZING MECHANISM
FOR CALCULATING MACHINES

Filed April 1, 1953 5 Sheets-Sheet 1

INVENTOR.

BY

April 8, 1958 R. FAIGLE 2,829,821

SELECTIVE DELAY NORMALIZING MECHANISM
FOR CALCULATING MACHINES

Filed April 1, 1953 5 Sheets-Sheet 2

INVENTOR.

INVENTOR.

INVENTOR.

April 8, 1958 R. FAIGLE 2,829,821

SELECTIVE DELAY NORMALIZING MECHANISM FOR CALCULATING MACHINES

Filed April 1, 1953 5 Sheets-Sheet 5

INVENTOR.

2,829,821

SELECTIVE DELAY NORMALIZING MECHANISM FOR CALCULATING MACHINES

René Faigle, Zurich, Switzerland, assignor to Marchant Calculators, Inc., a corporation of California Application April 1, 1953, Serial No. 346,156

Claims priority, application Switzerland April 9, 1952

8 Claims. (Cl. 235—60)

The present invention relates to calculating machines having one or more registers, each comprising a plurality of numeral wheels mounted in a carriage for transverse shifting movement relative to the numeral wheel actuators, and particularly concerns normalizing means for tabulating the carriage, clearing the registers and clearing the value entering mechanism.

Calculating machines are known which automatically initiate one or more clearing and shift functions at the conclusion of a calculating operation; however, in all previous cases the result register has not been automatically cleared for the obvious reason that the result would be destroyed before the operator could copy it down; it has heretofore been necessary to clear the result in response to depression of one of the control keys before beginning the next calculating operation.

According to the present invention, a time delay mechanism is enabled at the conclusion of each calculating operation to initiate the clearing and tabulating operations, the duration of delay being selectively adjustable by the operator to permit copying of the result of the calculation before clearance and tabulation are initiated. For this purpose a knob is provided exteriorly of the machine which may be manually adjusted to provide for a wide range of time delay required, such adjustment also permitting setting of the mechanism for "non-operation," i. e., suspension of the automatic clearing and tabulating operations.

Means are also provided for selecting which of the normalizing mechanisms are to be operated by the delay mechanism. For this purpose the delay mechanism operates a master initiating member having manually settable means for determining operation of any one or more of the following: the keyboard clearance mechanism, the accumulator register clearance mechanism, the counter register clearance mechanism, and the tabulating mechanism.

For purposes of illustration the present invention is shown as embodied in the commercially known Marchant calculating machine, reference being had to the U. S. Patent No. 2,271,240, issued January 27, 1942, for a description of the general construction and operation of the machine, and to the U. S. Patent No. 2,294,948, issued September 8, 1942, for a specific description of the carriage tabulating and clearing mechanisms.

Some improvements, not shown in the two above mentioned patents, have been incorporated in the machine in which the present invention is embodied, which improvements are pertinent to the present invention. Briefly, the patents show the use of a program clutch, referred to as a "setting clutch," which is operable upon depression of any calculation initiating key to perform various preliminary functions including engagement of the numeral wheels with their respective actuators prior to the calculating, or numeral wheel actuating, operation. After the calculating operation is completed, a second program clutch, referred to in the patents as a "restore" clutch is automatically engaged to disengage the numeral wheels and their actuators and return the machine to a position of rest. In the present machine the functions of the setting and restore clutches are combined into a single clutch, which is driven 180° to perform the functions previously ascribed to the setting clutch and after the calculations drive is complete, this clutch is driven a second 180° to its initial position during which it performs the functions of the above mentioned old "restore" clutch. In the present specification, this single clutch is referred to as the "setting" clutch, and furthermore, a new structure is provided whereby this clutch is rendered operable after its second 180° of rotation to initiate the operation of the previously mentioned time delay mechanism.

Such construction in a calculating machine for the four species entails simplification of operation with respect to heretofore known constructions, improves accuracy of work and permits speeding-up of the work. Further details and advantages of the invention will appear in the following description when read in conjunction with the accompanying drawings in which the elements necessary for explaining an embodiment of the invention are illustrated in connection with a motor-driven calculating machine for the four species, of the type having a counting carriage.

Figure 4:
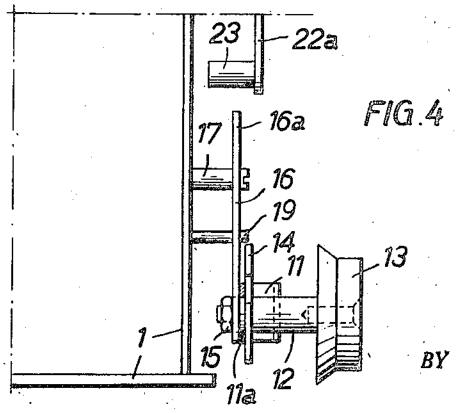
Fig. 4 is a partial view from the left in Fig. 1.

The schematically represented machine frame 1 (Fig. 1) supports a shaft 2 driven by the previously mentioned setting clutch, as more fully described hereinafter, and replacing as to its disposition and function the shaft of a heretofore known machine but which, in addition thereto, accomplishes further functions. For this purpose this shaft 2 projects laterally beyond the frame 1 and is provided on its outer end with a cam disc 3 adapted to cooperate with a lateral abutment roller 4 of a double-armed retarding lever 5, 5_a_ mounted on an axle 6 stationary with respect to the frame 1. The lever 5, 5_a_ is spring-loaded by a tension spring 7 fixed with its one end to the arm 5 of the retarding lever, while its other end is attached to the frame 1. The other arm 5_a_ of the retarding lever is connected with the rod 8 of a piston located in a cylinder 9 and forming with the latter a hydraulic brake. The cylinder 9 is swingable with respect to frame 1 about a pin 10. A rod 11 is hinged with its one end to the arm 5 and has its other end portion formed with a slot 11*a* in which is guided a pin 12, which forms a setting unit comprising a setting knob 13 and a setting cam 14. This unit 12—14 (Fig. 4) is pivotally adjustable on a lever 16 by means of its axle pin 12 and a nut 15 screwed onto said pin. The lever 16 (Fig. 1) is pivoted on a bolt 17 and has an end portion formed as a hook or pawl 16*a*. An abutment 19 is provided on the frame 1 for the locking lever 16, 16*a*, which is spring-loaded by a tension spring 18. The slotted rod 11 bears a lateral abutment 20 adapted to cooperate with the cam 14. On the axle 6 is also rotatably mounted a release lever 22 spring-loaded by a tension spring 21 and bearing on a lateral branch 22*a* an abutment roller 23 for the locking lever 16, 16*a*. The lever arm 5*a* of the retarding lever is provided with a lateral abutment 24 for the release lever 22. The latter bears at its corresponding end portion a laterally projecting pin 25, onto which is pivoted an auxiliary lever 26 normally held in abutment against a pin 28, provided on the arm 5*a*, by a tension spring 27. This auxiliary lever 26 is adapted to cooperate with a control arm 30 provided for this purpose with an abutment 29 and mounted on an axle 31 of the frame 1.

Figure 5:
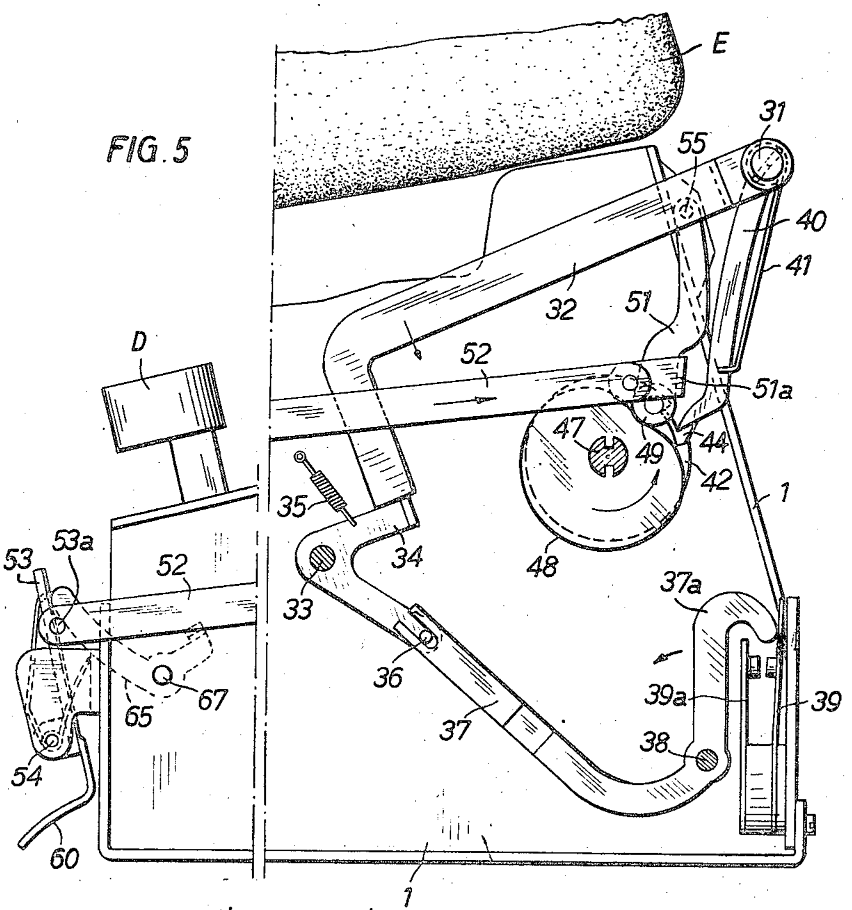
Fig. 5 is a side view of the side of the machine opposite of that seen in Fig. 1, showing further parts of the auxiliary device in rest position.
Figure 6:
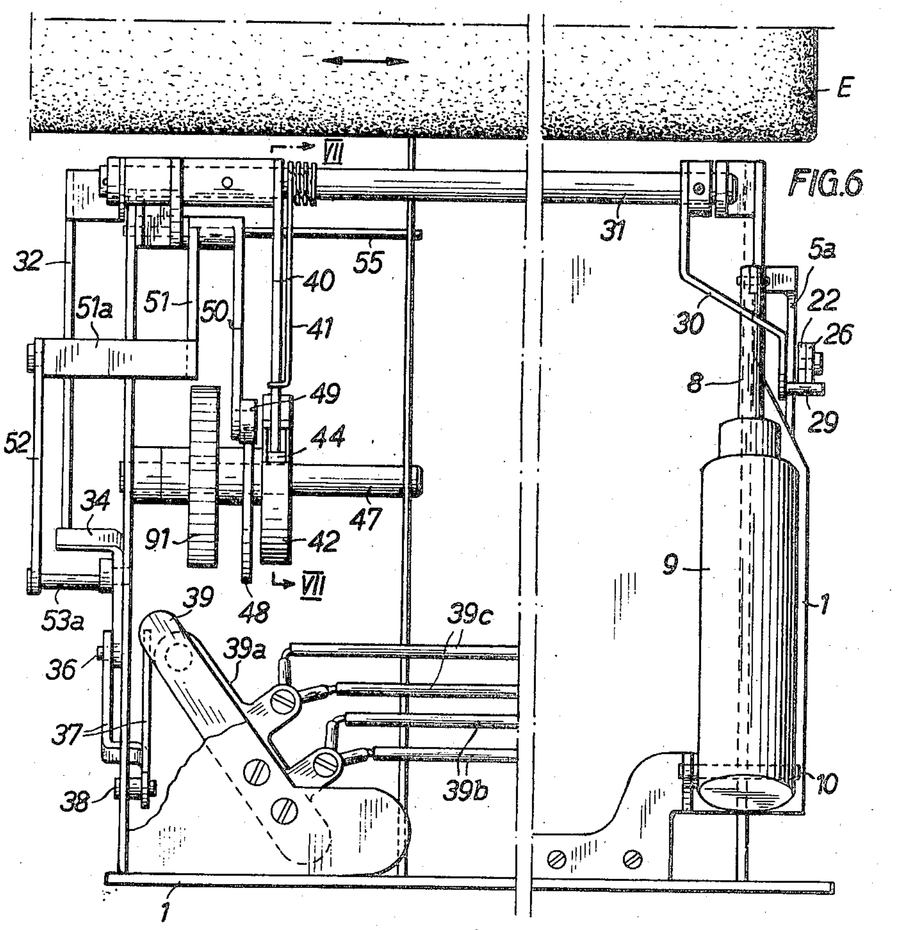
Fig. 6 is an elevation from the left in Fig. 1 and from the right in Fig. 5 respectively.
Figure 7:
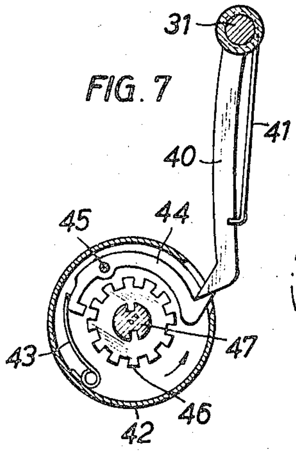
Fig. 7 is a section along the line 7—7 in Fig. 6.

As best seen in Fig. 6 the control arm 30 is mounted on one end of the axle 31 while the other end of said axle bears a crooked arm 32 serving, according to Fig. 5, to act upon an angle lever 34 mounted on an axle 33. This angle lever 34 is spring-loaded by a tension spring 35 acting upon one of its arms while the end of the other arm of the angle lever bears a pin 36 engaged in a fork of a lever 37 mounted on a pin 38. The other end of lever 37 is bent to form a hook 37*a* adapted to act upon a contact spring 39 cooperating with a contact spring 39*a*. The contacts 39 and 39*a* are connected by wires 39*b* and 39*c* respectively (Fig. 6), with the circuit of the not represented electrical motor of the machine. The axle 31 further bears a detent 40 pressed in direction of a coupling by a spring 41 (Figs. 6, 7). The coupling is housed in a flat housing 42 and comprises a rocking lever 44 loaded by a spring 43 and rocking about a pin 45 (Fig. 7) fixed to the housing 42. The lever 44 is provided at each end with a hook, one of which cooperates with the detent 40 while the other is adapted to cooperate with a rack disc 46 mounted on an axle 47 which also bears in loose connection the housing 42. The housing 42 is rigidly connected with a cam disc 48 (Fig. 6) cooperating with a roller 49 adapted laterally on an arm 50 of a fork, the arm 51 of which is connected by a bridge 51*a* with an arm 52 engaging a lateral arm 53*a* (Fig. 5) of a selector plate 53 swingably mounted on an axle 54 of frame 1 and secured against undesired axial displacement by a spring. The fork 50, 51 is mounted on an axle 55 fixed in the frame 1. The selector plate 53 (Fig. 9) is provided on its upper rim with four parallel cut-outs *a*, *b*, *c* and *d*. Levers 57, 58, 59, 60 mounted on the plate 53 for hand operation correspond one to each of the cut-outs *a*–*d*. Abutment pins 61 are provided on the plate 53 for limiting the rocking movement of the levers when they are rotated out of their working position in which working position they cover the mentioned cut-outs *a*–*d*.

Figures 9, 11:
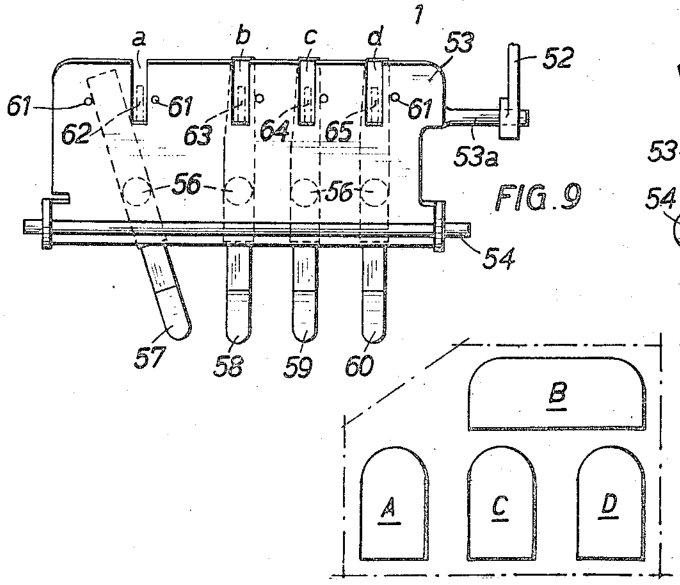
Fig. 9 is a front view of a swingable selector plate.
Fig. 11 is a top view of a group of control keys.
Figure 10:
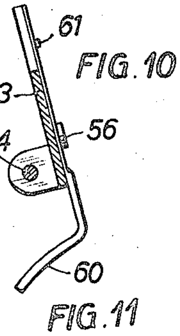
Fig. 10 is a cross-section through Fig. 9.

In the path of each of the four cut-outs *a*–*d* of the swingable selector plate 53 there are provided control levers 62, 63, 64, 65 as indicated in broken lines in Fig. 9. According to Fig. 12 the lever 62 is mounted on an axle 66 while the three control levers 63—65 are mounted on a common axle 67 as shown in Figs. 14–18. Each of the four control levers 62—65 has a function according to one of the keys A, B, C, D. Key A serves to release the cipher keys (value-setting keys) which may have been depressed for the calculating operation. Depression of key B initiates tabulation of the carriage to a predetermined ordinal position and the keys C and D serve to clear the indications of the accumulator and counter registers, respectively. Fig. 11 shows the disposition of the control keys A–D at the machine housing.

The key A is slidably guided by means of its shank 68 on a pin 69 (Figs. 12 and 13) and may cooperate by means of a lateral roller 70 with one leg 71*a* of a rocking fork 71 mounted on the axle 66 and carrying the control lever 62. The latter is provided with a downwardly directed arm 62*a* projecting through the fork 71. A link 72 is rotatably connected with its one end to the other leg 71*b* of the fork 71 and with its other end with the mechanism serving to release the cipher keys depressed for a calculating operation. This may be done either by hand by depressing the key A, or by the lever 62 as the latter is swung in the direction of the arrow in Fig. 12 by a corresponding rocking of the selector plate 53 through the arm 52 when the lever 57 is in working position covering the cut-out *a* of the selector plate 53, which is not the case in Fig. 9.

Figures 12, 13, 14, 15, 16, 17, 18:
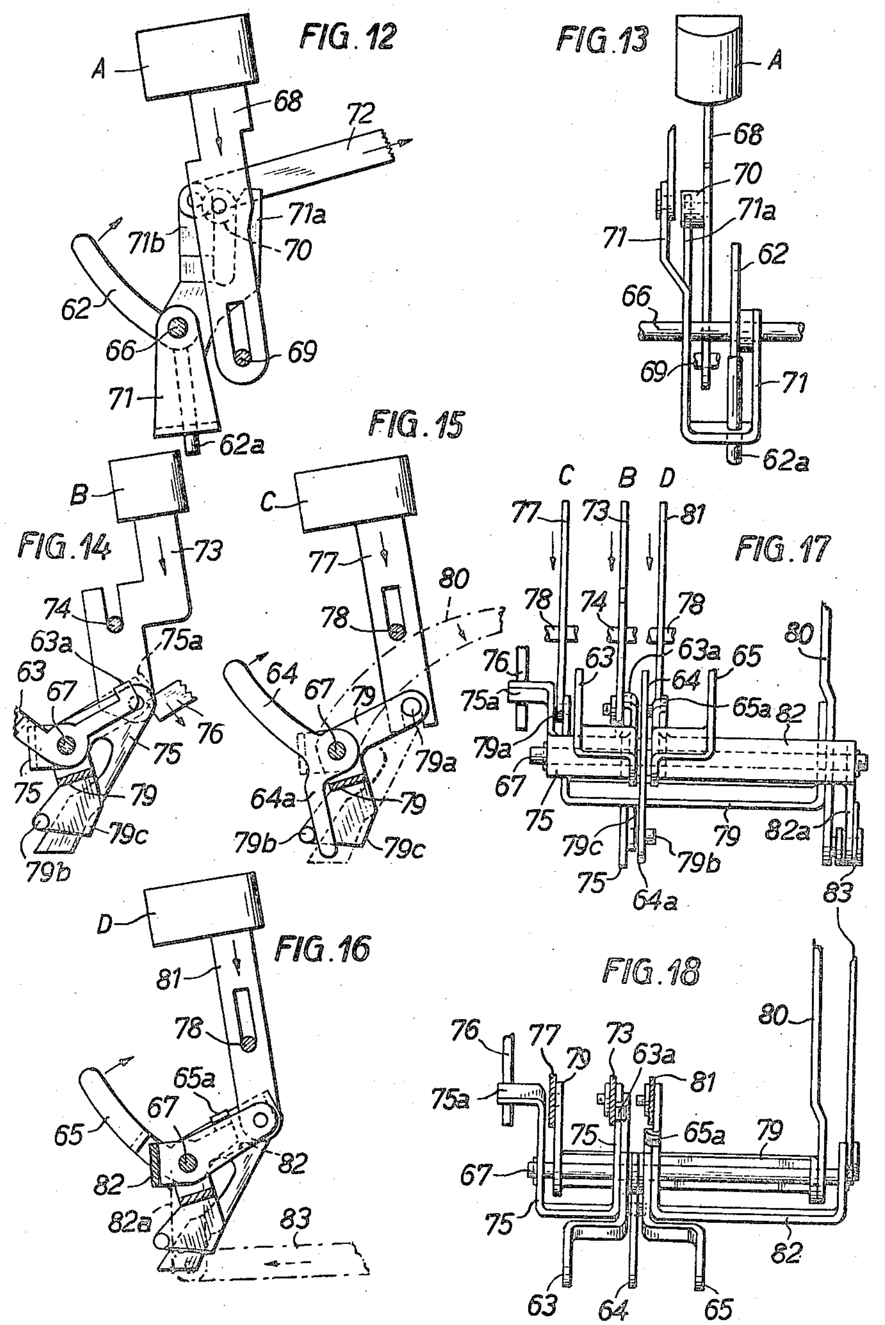
Fig. 12 is a control key for influencing the value-setting keys.
Fig. 13 is a view from the left in Fig. 12.
Fig. 14 shows a control key for influencing the shifting movement of the counting carriage.
Fig. 15 is a control key for the clearing of the indications of the result gear.
Fig. 16 is a control key for clearing the indication of the revolution counter.
Fig. 17 is a view from the left of Figs. 14–16, of the three control keys shown in said Figs. 14–16 and with which levers mounted on one axle are associated.
Fig. 18 is a plan section with respect to Fig. 17.

As shown in Figs. 14, 17 and 18 the control key B is slidably guided with its shank 73 on a pin 74 and hinged to a rocking element 75 mounted on the axle 67. This rocking element 75 has a leg engaging a hooked end portion 63*a* of the control lever 63.

The rocking element 75 further comprises an auxiliary arm 75*a* the bent end of which is situated near a setting lever 76, which, when actuated, tabulates the counting carriage E. This may be obtained either by depressing by hand the control key B, whereby the auxiliary arm 75*a* of the swinging rocking element 75 bears against the setting lever 76, or by a corresponding rocking of the selector plate 53, when the cut-out *b* of the latter is covered by lever 58, whereby the hooked end portion 63*a* of the lever 63 is brought to action against the setting lever 76. The counting carriage E, which is only represented by its cover plate, supports the accumulator and counter registers.

According to the Figs. 15, 17 and 18, the control key C is slidably guided by means of its shank 77 along a pin 78 and coupled at its lower end by an open slot to a pin 79*a* fixed on an arm of a rocking lever 79 mounted on the axle 67. If the key C is depressed by hand, the lever 79 executes a swinging movement rocking the clearing lever 80 connected with its second arm so that the indication of the accumulator register is cleared. This may be mechanically obtained by a corresponding rocking of the selector plate 53, when the cut-out *c* of the latter is covered by the lever 59, as the control lever 64 presses with its downwardly directed arm 64*a* onto an abutment 79*b* provided at a portion 79*c* of the lever 79 thus producing a rocking of the latter.

According to Figs. 16, 17 and 18 the control key D is slidably guided by its shank 81 along the pin 78 and hinged to one arm of a rocking lever 82 mounted on the axle 67. A rod 83 engages a downwardly directed auxiliary arm 82*a* of the lever 82 and is connected with the revolution counter. By depressing the key D by hand the lever 82 is rocked thus shifting and bringing into action the rod 83 over the arm 82*a*. This may be accomplished mechanically by rocking the selector plate 53 when the lever 60 closes the cut-out *d*, whereby the control lever 65 by means of its hooked end portion 65*a* rocks the lever 82 and thus actuates the rod 83.

The calculating machine is provided in a known way, e. g. as shown in U. S. Patent No. 2,333,234, issued Nov. 2, 1943, with a setting clutch which may be operated by the operator through special control keys. Operation of said setting clutch also actuates the electric motor of the machine. Each setting of a multiplier or of a divisor as well as depressing of either a plus or minus key results in operation of the setting clutch in order to start the different working operations at the beginning of a calculation. The setting clutch lowers the numeral wheels into engagement with their respective ordinal actuators and engages a main actuator drive clutch. At the end of the main actuator drive the main clutch is disengaged and the new setting clutch is re-engaged. This clutch raises the accumulator register numeral wheels out of engagement from their ordinal actuators and returns the machine to its normal condition of rest. The engagement of the setting clutch is caused in the case of a multiplication by depressing any of the keys 1 to 9 of the multiplier unit; in the case of a division by depressing of the key provided for automatic division; in the case of an addition or of a subtraction by depressing the corresponding plus or minus key, respectively. According to the operation designated by the depressed key the main clutch will remain in working position for one or several calculating operations.

Figure 8:
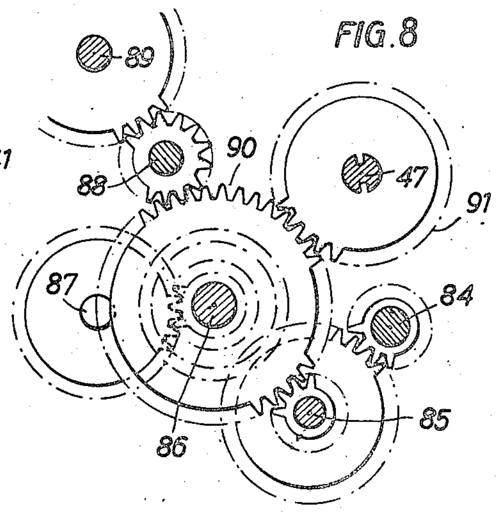
Fig. 8 shows cooperating gears with respect to Fig. 7.

In Fig. 8, 84 designates the motor shaft acting through suitable gears to drive the shafts 85—89. Shaft 87 transmits the motor drive to the shift clutch (not shown) and a motor drive is also transmitted to the setting clutch (not shown), which clutch is similar to the clutch shown in Fig. 7 with the exception that the setting clutch has two pawls such as pawl 44 for disengagement of the clutch after each 180° of drive. Such a clutch is shown in the previously mentioned U. S. Patent No. 2,271,240, which also discloses the clearance, shift and main actuator clutches. Since such clutches are conventional, detailed description is believed unnecessary.

It is understood, however, that depression of any calculating initiating key causes engagement of the setting clutch by rocking the clutch detent (similar to detent 40, Fig. 7) to clutch engaging position and furthermore that a conventional motor switch is held closed by the detent to keep the motor energized as long as the clutch is engaged. Similar conventional switch means are provided for the shift clutch, the clearance clutches, the main clutch, and optionally may be provided as an alternative form of switch for the clutch shown in Fig. 7. The main clutch is driven by shaft 89. A further not shown shaft drives the clearing clutch. The shaft 86 transmits a drive through gear wheels 90 and 91 to the shaft 47 and the rack disc 46 mounted thereon in the housing 42 (Figs. 7, 6). The reference numeral 92 in Figs. 1 and 2 designates a shaft mounted in the frame 1 and associated to the calculating device.

The actuation of the setting clutch due to depressing of a key entails a complete revolution of the shaft 2 carrying the cam disc 3, for each calculating operation. This rotation through 360° is effected in two half-revolutions of the shaft 2. During the first of these half-revolutions of the auxiliary shaft 2 the counting carriage is lowered from its upper position into its lower position, after which the mechanical calculating work is effected, in known manner, by means of a feeler device scanning the set values. During the yet short moment in which the shaft 2 stands still, the calculating operation is effected, whereupon during the second half-revolution of shaft 2 the counting carriage E is lifted again. Simultaneously, the completion of the second half revolution of shaft 2 and cam 3 enables the time delay device 9 to initiate the selective engagement of the various clear and shift clutches together with the release of the key board keys.

Figure 1:
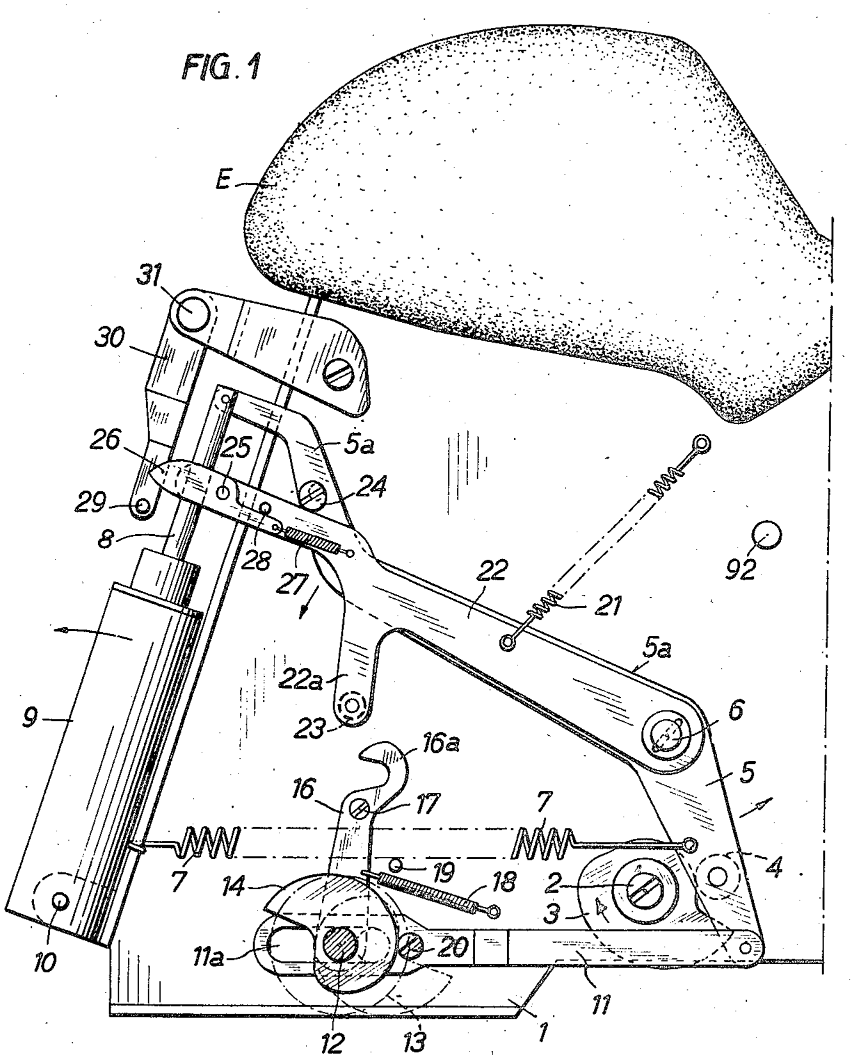
Fig. 1 is a side-view of a retarding device in rest position.
Figure 2:
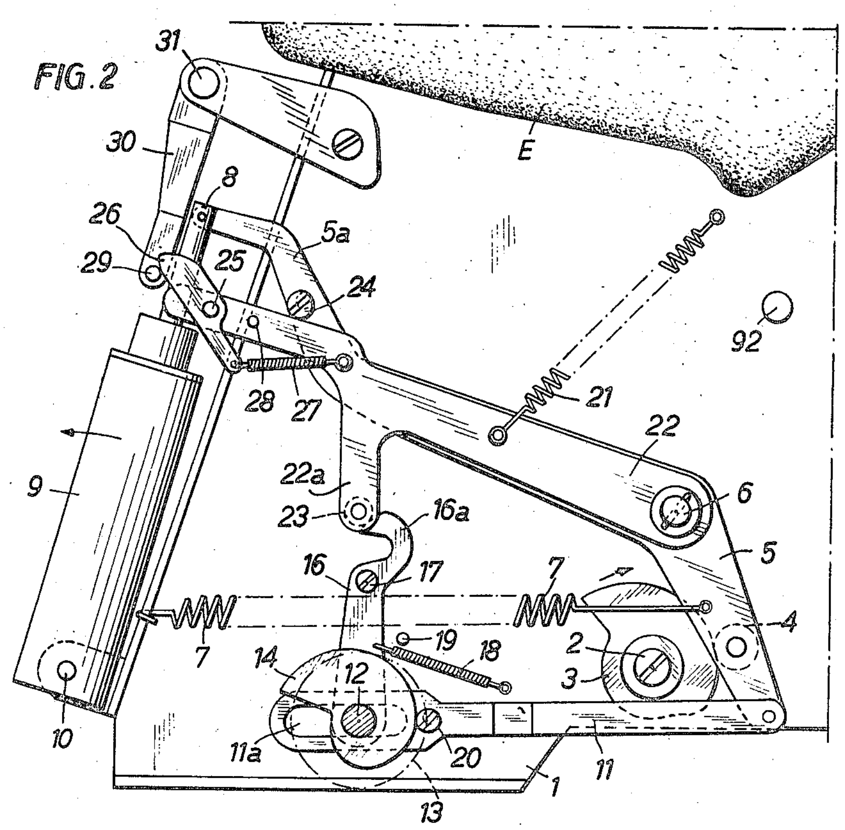
Fig. 2 shows a similar view of the same device in an intermediate position.

During the first half rotation of shaft 2 the cam disc 3 acting upon the roller 4 rocks the retarding lever 5, **5*a* out of its rest position as shown by the arrows in Fig. 1. Thereby the piston rod 8 moves the brake piston provided in the cylinder 9 in downward direction. The abutment 24 of the lever 5, 5*a* accordingly rotates the release lever 22, whereby the abutment roller 23 of the latter comes into engagement with the locking lever 16. The auxiliary lever 26 is swung out of its rest position, against the action of spring 27, when it abuts against the abutment 29 of the control arm 30. This results in the intermediate position shown in Fig. 2 of the auxiliary device which lasts as long as the standstill of shaft 2** between its two half-revolutions.

Figure 3:
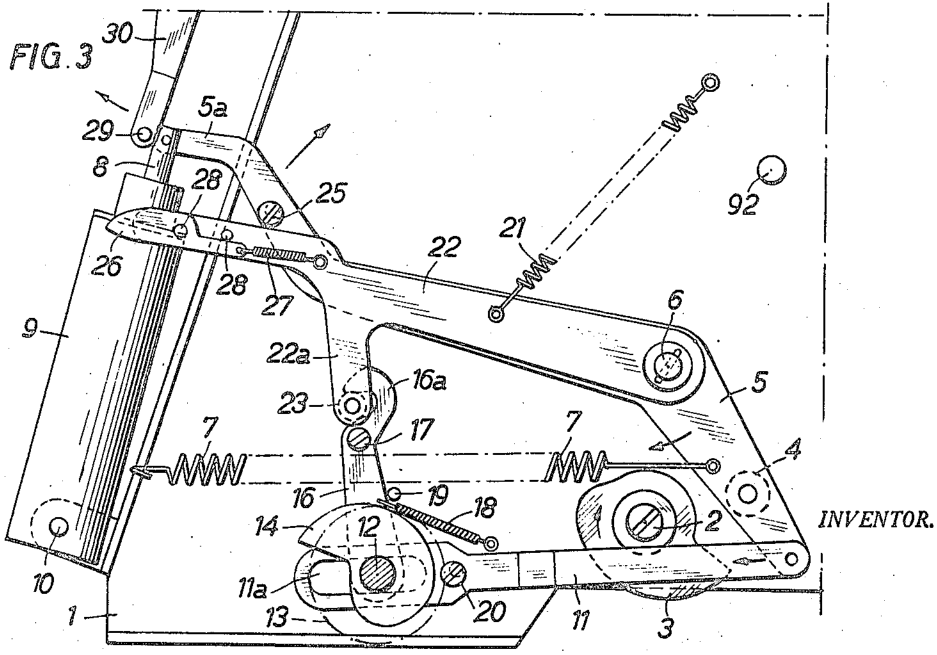
Fig. 3 shows still the same device in a certain working position.

During the second half-revolution of shaft 2 the lever 5, **5*a* is first further swung in the aforementioned direction, whereby the spring-loaded locking lever 16, 16*a* comes into cooperation with the roller 23 of the release lever 22 as shown in Fig. 3. The locking lever 16, 16*a* is thus pivoted about its axle 17 and pushed against the stationary abutment 19 by its spring 18. The pin 12 thereby accordingly moves in the elongated slot 11*a* of the rod 11. At a further stage the roller 4 of the retarding lever 5, 5*a* comes out of touch with the rotating cam disc 3, whereupon the lever 5, 5*a* is actuated by the tension spring 7 in the sense of an upwardly directed movement of the piston rod 8 and of the braking piston in cylinder 9. Previously the motor of the machine had been automatically disconnected so that the shaft 2 has come to a standstill. The upward movement of the piston rod 8 and of the piston is slower than the previous downward movement due to the liquid present in the cylinder 9. The retarding lever 5, 5*a* now pivots, without the release lever 22 locked by the locking lever 16, 16*a*, in the direction of the arrow in Fig. 3 and thereby actuates the rod 11 guided on the pin 12. After a certain translatory movement of the rod 11 the lateral abutment 20 of the latter contacts the curved periphery of the cam 14 thus producing a gradual rotation of the lever 16 which then liberates the roller 23 and the release lever 22. According to the angular position adjustable by the button 13, of the cam 14 with respect to the lever 16 the release lever will be liberated sooner or later. After its liberation the release lever 22 jerks upwards under the action of its spring 21, so that it again abuts against the abutment 24 of the retarding lever 5. On this upward jerking of the release lever 22 the auxiliary lever 26 becomes operative on the abutment 29 of the control arm 30. Thereby the lever 26 finds itself blocked at the pin 28 of the lever arm 5*a*. The lever 26 pivots the control arm 30 in the direction of the arrow in Fig. 3 thereby rotating the shaft 31, which through the arm 32 (Fig. 5) and angle lever 34 pivots the lever 37 in the direction shown by an arrow in Fig. 5. The contact spring 39 heretofore held back by the lever arm 37*a* now contacts the contact spring 39*a* thereby closing the motor circuit of the machine. As soon as the auxiliary lever 26 liberates the abutment 29 of the control arm 30, the latter returns into its rest position under the action of its spring and the switch lever 37 again brings the contact spring 39 into its inoperative position, which time is sufficient for driving the clutch 42 for its single cycle of rotation. As previously mentioned, the setting, shift, clearance and main clutches are also provided with motor switches which are held closed by their respective clutch control levers as long as the clutches are engaged; therefore the motor is de-energized during the period of time delay which elapses between termination of operation of the setting clutch and the subsequent operation of the auxiliary clutch 42**.

When the control arm 30 is pivoted out of its rest position in the aforementioned way, the axle 31 also rotates the detent 40 mounted on it. Upon such rotation the detent 40 slides from the rocking lever 44 after which the latter, under the action of its spring 43, clutches the housing 42 to the motor driven ratchet 46. The housing 42 effects a complete revolution during which the lever 44, projecting out of the rotating housing 42 through an opening in the latter abuts against the detent 40 which is in its rest position, resulting in a release of the lever 44. Together with said housing 42 the cam disc 48 effects a complete revolution too, whereby the spring-loaded fork 50, 51 and **51*a*, controlled by the cam 48 through the roller 49, causes with the help of the governor 52 a rocking of the selector plate 53 around its axle 54. Now according to the cover levers 57–60** covering the cut-outs *a–d* of the selector plate or not, the latter will or will not influence the control levers of the keys A–D. This is determined by the operator in that the latter takes care that the selector plate 53 cannot influence the keys the function of which may be used for the continuation of the calculation. For this purpose at the beginning of the operation the lever or levers (57–60) which may come into question must be in the inoperative position on the plate 53. On the other hand the four control keys A–D may as before be depressed, i. e. brought into operative position, by hand independent from the selector plate 53.

The above described auxiliary device enables the following working possibilities given by way of example.

*Addition.*—After having been indicated a period sufficient for its being transcribed by hand the result is automatically cleared; it is therefore not necessary to depress a special key for clearing the indication of the value-indicating devices previous to a new addition. It is possible to maintain the item check.

*Subtraction.*—The advantage set forth above with respect to addition is valuable for the subtraction too. It is possible to start subtraction with the subtrahend.

*Multiplication.*—The indications of the value-indicators are cleared at beginning of operation; thus transcribing of a wrong result after an interruption of work is avoided. At the end of the multiplication the operator may check the multiplicator and multiplicand. Corrections in the result may therefore be made without a new setting of the multiplicator.

The described auxiliary device offers several further possibilities for influencing the calculating operations due to the possibility of selecting the cut-outs *a–d* of the selector plate 53 by accordingly adjusting the levers 57–60.

The abutments 20 and 24 on the rod 11 and at the retarding lever 5, 5*a* are formed as rotatably adjustable eccentrics, so that the moment of their entering into operation may be pre-adjusted. The knob 13 and cam 14 may be adjusted according to a not represented scheme for determinating the moment of operation of the abutment 20 of the rod 11, so that the time of movement of the retarding lever 5, 5*a* may vary between a determined time of 1 to 10 seconds, for example in order to leave plenty of time for transcribing and checking the result. Then in a new working operation the result indicated by the result counter is cleared, the revolution counter is set on zero, the value-setting keys are brought back into their rest position and the counting carriage is moved into its predetermined position. These functions, which may be set by the operator, at choice, permit the machine to automatically retard this function without a key depression. The operator further finds the machine after each calculating operation back in its zero position, as far as this is requested for the calculations to be effected. Of course all these and similar functions may be used in a bookkeeping machine constructed accordingly.

By setting the knob 13 to zero the whole retarding device is inoperative, as in this case at actuation of rod 11 the abutment 20 of the latter does not reach the cam 14. Furthermore, it will be noted that the keys A, B, C, D (Fig. 11) may be manually depressed without affecting the setting of the corresponding enabling and disabling levers 57–60 (Fig. 9). In this manner the operator may set the levers 57–60 in one position for performing a series of similar calculations and interrupt such calculations for a special operation by manual operation of keys A–D without changing the levers 57–60. Likewise upon liberation of all cut-outs *a–d* of the selector plate 53 by the levers 57–60, the moved selector plate 53 cannot influence the levers 52–65. Of course the control keys A–D are spring loaded as well as other parts as far as this is necessary. Such spring-loading has not been represented in the drawings. The described auxiliary device which with respect to some details may be other than shown on the drawings may easily be built-in into ordinary calculating machines.

Every calculating machine employs a mechanism for terminating the operation of the machine after the desired calculation has been completed, and the present invention has been disclosed as embodied in a calculating machine which employs a program (setting) clutch for terminating the machine operation. It has therefore been convenient to employ the program clutch for initiating the operation of the delay device; it will be obvious, however, that the invention may well be used in those machines not having a program clutch by the simple expedient of employing the usual terminating mechanism to initiate the operation of the delay device.

What I claim is:

1. In a calculating machine having a result register including numeral wheels, digital actuating means therefor, and a mechanism for resetting the numeral wheels of said result register to zero; the combination of: a key, means responsive to depression of said key to initiate a calculating operation and to terminate said operation, control means for initiating operation of said resetting means comprising a delay device selectively settable to determine the duration of delay, and means responsive to said terminating means to cause operation of said control means.

2. In a calculating machine having a result register including numeral wheels, digital actuators therefor, means for tabulating said result register to a pre-determined position relative to the digital actuators, and mechanism for resetting said numeral wheels to zero; the combination of, a key for causing a machine operation including operation of the digital actuators and termination of the machine operation, a common control means comprising a delay device selectively settable to determine the duration of delay and effective after such delay to initiate the operation of said tabulating means and said resetting mechanism, and means responsive to said terminating means to cause operation of said control means.

3. A calculating machine according to claim 2 in which the control means includes respective means for enabling and disabling the delay device with respect to both the tabulating means and the resetting mechanism.

4. In a calculating machine including a register comprising numeral wheels and actuators therefor, means for tabulating said register relative to the actuators, and mechanism for resetting said numeral wheels to zero; the combination of, a key, mechanism responsive to depression of said key to cause a calculating operation and to terminate such operation, a member adapted for movement from a first position to a second position, and settable devices operable upon movement of said member to its second position to determine initiation of operation of said tabulating means and said resetting means, means operable upon termination of said calculating operation to move said member to its second position including a time delay mechanism, and selectively settable means for enabling and disabling said delay mechanism.

5. In a calculating machine having a register comprising numeral wheels, actuating means for said numeral wheels, normalizing mechanism including means for tabulating said register and resetting said numeral wheels to zero, a key, and operation control means responsive to depression of said key to cause a calculating operation, said control means including a program member operable to engage and disengage the numeral wheels from the numeral wheel actuating means; the combination of an operation delay device enabled by said program member after said disengagement between the actuators and numeral wheels to initiate the operation of the normalizing mechanism after a predetermined period of delay, and manually settable means for determining the duration of said delay.

6. In a calculating machine having a register including numeral wheels, actuating means for said numeral wheels, value entry mechanism for adjusting said actuating means, means for shifting said register relative to the numeral wheel actuators, mechanism for resetting said numeral wheels to zero, and a resetting means for the value entry mechanism; the combination of respective control means for initiating the operation of the shifting means, the numeral wheel resetting mechanism and the value entry resetting means, a unitary member movable from a first position to a second position to cause simultaneous operation of said control means, a delay device operable upon termination of a calculating operation involving actuation of the numeral wheels, means responsive to the operation of said delay device to move said member to its second position after a delay of predetermined duration, and selectively settable means for determining the duration of delay.

7. A calculating machine according to claim 6 in which the selectively settable means for the delay device may be adjusted to prevent operation of the delay device.

8. A calculating machine according to claim 6 in which the movable unitary member includes selectively settable means for enabling and disabling said member with respect to the respective initiation control means.

References Cited in the file of this patent

UNITED STATES PATENTS

| | | |
|---|---|---|
| 1,164,736 | Mantel et al. | Dec. 21, 1915 |
| 2,046,820 | Hilder | July 7, 1936 |
| 2,294,948 | Avery | Sept. 8, 1942 |
| 2,416,809 | Avery | Mar. 4, 1947 |
| 2,567,120 | Nolde | Sept. 4, 1951 |
| 2,581,218 | Thompson | Jan. 1, 1952 |